United States Patent
Ebrahimi Afrouzi

(10) Patent No.: US 12,053,674 B1
(45) Date of Patent: Aug. 6, 2024

(54) SMART GYM EQUIPMENT

(71) Applicant: Ali Ebrahimi Afrouzi, Henderson, NV (US)

(72) Inventor: Ali Ebrahimi Afrouzi, Henderson, NV (US)

(73) Assignee: AI Incorporated, Toronto (CA)

( * ) Notice: Subject to any disclaimer, the term of this patent is extended or adjusted under 35 U.S.C. 154(b) by 266 days.

(21) Appl. No.: 17/550,986

(22) Filed: Dec. 14, 2021

Related U.S. Application Data

(63) Continuation of application No. 16/372,471, filed on Apr. 2, 2019, now abandoned.

(60) Provisional application No. 62/656,803, filed on Apr. 12, 2018.

(51) Int. Cl.
*A63B 24/00* (2006.01)
*G06F 3/0482* (2013.01)
*G06N 3/08* (2023.01)
*G06N 20/00* (2019.01)

(52) U.S. Cl.
CPC ........ *A63B 24/0087* (2013.01); *G06F 3/0482* (2013.01); *G06N 3/08* (2013.01); *G06N 20/00* (2019.01)

(58) Field of Classification Search
CPC .... A63B 24/0087; G06F 3/0482; G06N 3/08; G06N 20/00
See application file for complete search history.

(56) References Cited

U.S. PATENT DOCUMENTS

| | | | | |
|---|---|---|---|---|
| 6,071,216 A | * | 6/2000 | Giannelli | A63B 21/4035 482/136 |
| 6,142,917 A | * | 11/2000 | Giannelli | A63B 23/1209 482/136 |
| 6,254,516 B1 | * | 7/2001 | Giannelli | A63B 23/1209 482/136 |
| 6,287,243 B1 | * | 9/2001 | Isom | A63B 21/4029 482/130 |
| 7,364,535 B1 | * | 4/2008 | Rosenow | A63B 21/4033 482/142 |
| 7,473,211 B2 | * | 1/2009 | Lee | A63B 21/063 482/97 |
| D612,437 S | * | 3/2010 | Fenster | D21/675 |
| D613,350 S | * | 4/2010 | Fenster | D21/675 |

(Continued)

FOREIGN PATENT DOCUMENTS

| | | |
|---|---|---|
| AU | 2009100694 A4 | 8/2009 |
| CN | 101791466 B | 2/2013 |

(Continued)

*Primary Examiner* — Garrett K Atkinson

(57) ABSTRACT

Provided is a smart gym equipment, including a frame; a plurality of sensors; at least one actuator; a plurality of weights; a processor; and, a tangible, non-transitory, machine-readable medium storing instructions that when executed by the processor effectuates operations including: obtaining, with the processor, sensor data captured by at least some of the plurality of sensors; receiving, with the processor, input data; determining, with the processor, at least one equipment setting of the smart gym equipment based on at least some of the input data and at least one relationship relating the at least some of the input data to the at least one equipment setting; and instructing, with the processor, the at least one actuator to automatically implement the at least one equipment setting.

20 Claims, 4 Drawing Sheets

(56) References Cited

U.S. PATENT DOCUMENTS

| | | | | |
|---|---|---|---|---|
| 7,717,836 | B1* | 5/2010 | Miller | A63B 21/00 |
| | | | | 482/142 |
| 7,753,830 | B1* | 7/2010 | Marsh | A63B 23/03525 |
| | | | | 482/142 |
| 9,610,476 | B1* | 4/2017 | Tran | A61B 5/11 |
| 9,849,364 | B2* | 12/2017 | Tran | G16H 40/63 |
| 10,022,614 | B1* | 7/2018 | Tran | G16H 50/20 |
| 2003/0092543 | A1* | 5/2003 | Giannelli | A63B 21/4035 |
| | | | | 482/99 |
| 2005/0032614 | A1* | 2/2005 | Keiser | A63B 21/4029 |
| | | | | 482/142 |
| 2006/0058156 | A1* | 3/2006 | Cohen | A63B 24/00 |
| | | | | 482/4 |
| 2009/0075791 | A1* | 3/2009 | Kissel | A63B 21/155 |
| | | | | 482/93 |
| 2015/0148203 | A1* | 5/2015 | Rios Sodeyama | A63B 21/00076 |
| | | | | 482/112 |
| 2017/0232300 | A1* | 8/2017 | Tran | G06F 1/163 |
| | | | | 434/247 |

FOREIGN PATENT DOCUMENTS

| | | |
|---|---|---|
| CN | 102451544 B | 8/2013 |
| CN | 103956174 A | 7/2014 |
| CN | 105931325 A | 9/2016 |
| CN | 106897783 A | 6/2017 |
| CN | 107583261 A | 1/2018 |
| CN | 107993700 A | 5/2018 |
| CN | 207420112 U | 5/2018 |
| CN | 207458369 U | 6/2018 |
| CN | 207924830 U | 9/2018 |
| CN | 108961859 A | 12/2018 |

* cited by examiner

SMART GYM EQUIPMENT

CROSS-REFERENCE TO RELATED APPLICATIONS

This application is a Continuation of U.S. patent application Ser. No. 16/372,471, filed Apr. 2, 2019, which claims the benefit of U.S. Provisional Patent Application No. 62/656,803, filed Apr. 12, 2018, each of which is hereby incorporated by reference.

FIELD OF THE DISCLOSURE

The disclosure relates to gym equipment.

BACKGROUND

The majority of gym equipment is manual. A person exercising is required to manually adjust the weight of an exercise machine or choose a specific free weight based on their weight lifting abilities. At times this can be cumbersome, as estimating your own weight lifting abilities and weight lifting limits can be difficult. Furthermore, throughout an exercise the weight lifting ability and weight lifting limit of a person can change due to, for example, increased tiredness with increased repetition. In other instances, a person may not be able to achieve their true weight lifting limit due to safety concerns the person may have (e.g., absence of a spotter, injury).

SUMMARY

The following presents a simplified summary of some embodiments of the techniques described herein in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

Provided is a smart gym equipment, including: a frame; a plurality of sensors; at least one actuator; a plurality of weights; a processor; and, a tangible, non-transitory, machine-readable medium storing instructions that when executed by the processor effectuates operations including: obtaining, with the processor, sensor data captured by at least some of the plurality of sensors; receiving, with the processor, input data; determining, with the processor, at least one equipment setting of the smart gym equipment based on at least some of the input data and at least one relationship relating the at least some of the input data to the at least one equipment setting; and instructing, with the processor, the at least one actuator to automatically implement the at least one equipment setting.

DETAILED DESCRIPTION OF SOME EMBODIMENTS

Figure 1:
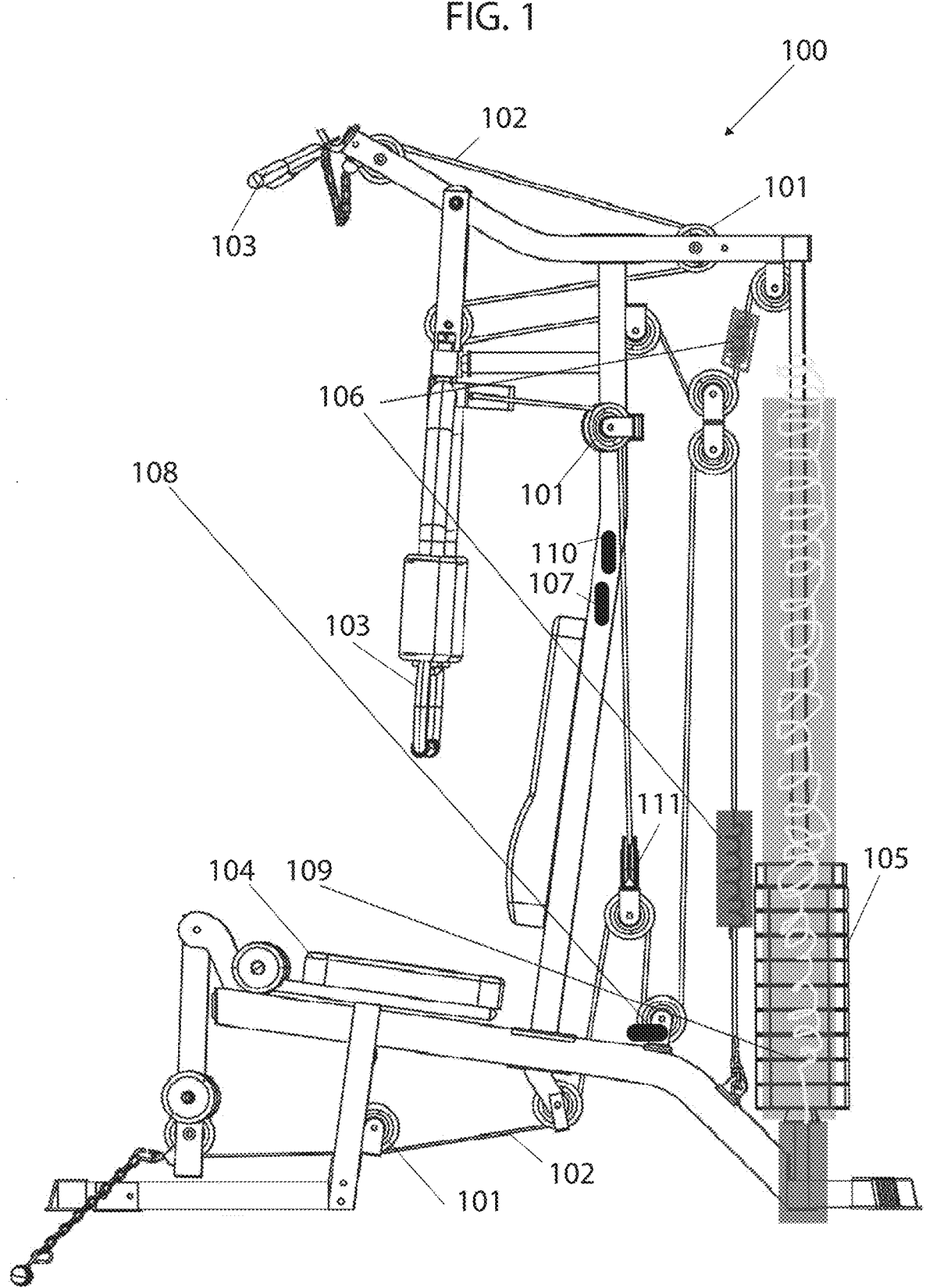
FIG. 1 illustrates an example of smart gym equipment, according to some embodiments.

The present invention will now be described in detail with reference to a few embodiments thereof as illustrated in the accompanying drawings. In the following description, numerous specific details are set forth in order to provide a thorough understanding of the present inventions. It will be apparent, however, to one skilled in the art, that the present invention may be practiced without some or all of these specific details. In other instances, well known process steps and/or structures have not been described in detail in order to not unnecessarily obscure the present invention. Further, it should be emphasized that several inventive techniques are described, and embodiments are not limited to systems implanting all of those techniques, as various cost and engineering trade-offs may warrant systems that only afford a subset of the benefits described herein or that will be apparent to one of ordinary skill in the art.

Some embodiments provide smart gym equipment including one or more sensors, one or more actuators, one or more weights, and a processor. In some embodiments, the one or more sensors include force sensors, weight sensors, accelerometers, optical encoders, optical sensors, extensometers, and the like. For example, a person may lift a weight by pulling on a handle attached to a first end of a cable, the cable arranged on a pulley and weight being attached to a second end of the cable. In this example, a weight sensor may measure the weight being lifted by the person or an optical encoder positioned on the pulley may measure the distance the weight travelled. In some embodiments, the processor receives data from the one or more sensors and executes actions based on the data received. For example, if a distance a weight has travelled is only half the maximum travel distance of the weight, the processor may reduce the weight being lifted by the person. In some embodiments, the smart gym equipment includes magnets that are used to increase or decrease the weight being lifted by the person. In some embodiments, a weight is connected to a wire and the processor adjusts the amount of electrical current flowing through the wire to increase or decrease the strength of the magnetic field. For example, the processor may increase the magnetic field of a first weight being lifted by the person and a second weight to pull the second weight towards the first weight and increase the weight being lifted by the person.

In some embodiments, the processor stores sensor data collected by the one or more sensors in a memory. In some embodiments, other types of data are stored. In some embodiments, the processor stores data for one or more persons using the smart gym equipment and determines unique equipment settings for each person based on the sensor data received. In some embodiments, data stored for a person can include the person using the machine, age of the person, weight and height of the person, exercise goals (e.g., duration of exercise, target weight of the person, target lifting weight for a particular exercise, target number of repetitions for a particular exercise, etc.), time and date of use, exercises performed, weight lifted for each exercise performed, duration of each exercise performed, the number of repetitions for each exercise performed, the level of completion of each repetition performed, maximum weight lifted for each exercise performed, duration of total exercise session, and the like. Equipment settings can include, for example, a particular exercise, a magnitude of weight for a particular exercise, a duration for performing a particular exercise, number of repetitions for a particular exercise, change in the magnitude of weight during a particular exercise and at which repetition the change is implemented, the order of exercises performed during an exercise session, total duration of an exercise session, the television channel or program to display on a screen, a height of a component of the smart gym equipment for a particular exercise, an angle of a component of the smart gym equipment for a particular exercise, a position of a component of the smart gym equipment for a particular exercise, and the like. Examples of components of the smart gym equipment can include a handle, a bench, a seat, a pulley, a strap, and the like.

In some embodiments, a person inputs data and chooses equipment settings using a user interface of the smart gym equipment (e.g., touchscreen), an application of a communication device (e.g., mobile device, tablet, laptop, desktop computer, etc.) paired with the processor of the smart gym equipment, or other device with a user interface and capable of communicating with the processor of the smart gym equipment. For example, in some embodiments, a person may use the user interface to input their weight, age, height, medical history, exercise goals, and the like upon their first use of the smart gym equipment. In another example, the person may use the user interface to choose the magnitude of a weight for lifting for a particular exercise and the processor adjusts the smart gym equipment adjusts the weight to that chosen by the person. In another example, the person uses the user interface to choose a particular exercise from a repertoire of different available exercises. In some embodiments, the processor prepares the machine for the particular exercise. In some embodiments, the person is presented with suggested exercises for an exercise session (e.g., based on exercise history, sensor data, fitness level, weight, age, etc.) and uses the user input to accept or decline. In one example, the person chooses one or more exercises, the magnitude of weight for lifting for each exercise, and the number of repetitions for each exercise using the user interface. In some embodiments, the processor adjusts the smart gym equipment for the next exercise after the number of repetitions for the current exercise has been reached. Adjustment to the smart gym equipment can include, for example, adjustment of pulleys, adjustment in magnitude of the weight for lifting, adjustment of cables, adjustment of a bench or seat, adjustment of handle attached to the cable, and the like. In one example, the person selects a particular muscle group using the user interface and a selection of possible exercise routines for that muscle group including multiple exercises are presented to the person on the display screen of the user interface for the person to choose from. In some embodiments, the person watches a demonstration (e.g., a video including audio displayed on a user interface of the smart gym equipment, in which case the smart gym equipment may include speakers) of a particular exercise on the display screen of the user interface.

In some embodiments, the processor uses machine learning with neural networks to determine unique equipment settings for a person based on input data. In some embodiments, the processor uses deep neural networks to learn complex, non-linear functions. In some embodiments, the deep neural networks recognize patterns by clustering and classifying data. In some embodiments, the neural networks establish correlations between the input data. In some embodiments, the application is trained to determine equipment settings of a person based on input data provided. In some embodiments, training includes the person manually choosing equipment settings while simultaneously receiving input data from the one or more sensors of the smart gym equipment. In some embodiments, the processor learns a function that relates input data to equipment settings for the particular person. In some embodiments, different input data are assigned different weights based on their importance in predicting the equipment settings. In some embodiments, during training the processor predicts equipment settings using the currently learned function and compares the prediction to the actual equipment settings chosen by the person. In some embodiments, the processor determines a prediction error and backpropagates the error through the neural network, thereby adjusting the learned function. In some embodiments, the error is backpropagated by adjusting the weight assigned to different types of sensor input. In some embodiments, the processor uses tracking error gradient descent to reduce the error. In some embodiments, training is performed for a predetermined amount of time, or until the success rate or error of the equipment settings predicted by the neural network is above or below a predetermined threshold, respectively.

In some embodiments, the person uses the user interface to rate one or more equipment settings predicted by the processor. In some embodiments, the processor adjusts the function learned based on the ratings received. In some embodiments, the processor suggests equipment settings to the person and the person accepts or declines the suggested equipment settings using the user interface. In some embodiments, the processor adjusts the function learned based on the response to the suggestions provided to the person. In some embodiments, the processor adjusts the function by adjusting the weight assigned to different types of input data based on the ratings or response to the suggestions provided to the person. In some embodiments, the processor adjusts the function learned each time the predicted equipment setting is adjusted by the person.

In some embodiments, the neural network implements a Markov Decision Process in learning the relationship between equipment settings and input data. In some embodiments, the processor assigns a reward each time positive feedback from a user is received. In some embodiments, the application assigns a penalty each time negative feedback from a user is received. Examples of feedback include a change or no change in equipment settings chosen by the processor, user ratings, user response to suggestions, etc. In some embodiments, different types of feedback or feedback for different equipment settings have different magnitudes of reward or penalty. In some embodiments, the processor minimizes a cost function or maximizes a reward function to optimize the function predicting equipment settings.

In some embodiments, the processor learns training methods used by a trainer of a person using the techniques described herein. In some embodiments, a person chooses a training mode of the smart gym equipment and the processor chooses exercise routines according to the training methods learned. In some embodiments, the processor learns training methods of particular trainers and the person chooses a particular trainer (e.g., based on their training methods). In some embodiments, the user interface displays pre-recorded or live-feed videos of the trainer during exercise sessions. In some embodiments, the trainer is financially compensated by the person when chosen. In some embodiments, the person compensates the trainer using the user interface by making an electronic payment.

FIG. 1 illustrates an example of a smart gym equipment 100 with pulleys 101, cables 102, handles 103, seat 104, and weights 105. In some embodiments, smart gym equipment 100 includes springs 106 attached to cables 102. In some embodiments, an extensometer measures extension of springs 106 and a processor 107 of the smart gym equipment 100 determines a force based on at least the extension of the spring and spring stiffness. In some embodiments, smart gym equipment 100 includes an optical sensor 108 to measure acceleration of the cables during an exercise. In some embodiments, smart gym equipment 100 passes electricity 109 along a wire contacting weights 105. Processor 107 adjusts the magnitude of electrical current 109 to adjust the magnetic field of weights 105 to reduce or increase the amount of weight lifted by a person. Smart gym equipment 100 also includes memory 110 and actuator 111 that autonomously adjusts the position of the pulley it is attached to. FIG. 1 is merely an example of a smart gym equipment. Several configurations are possible. For example, in other configurations actuators can be used to adjust position, angle, and height of any components of the smart gym equipment.

Figure 2:
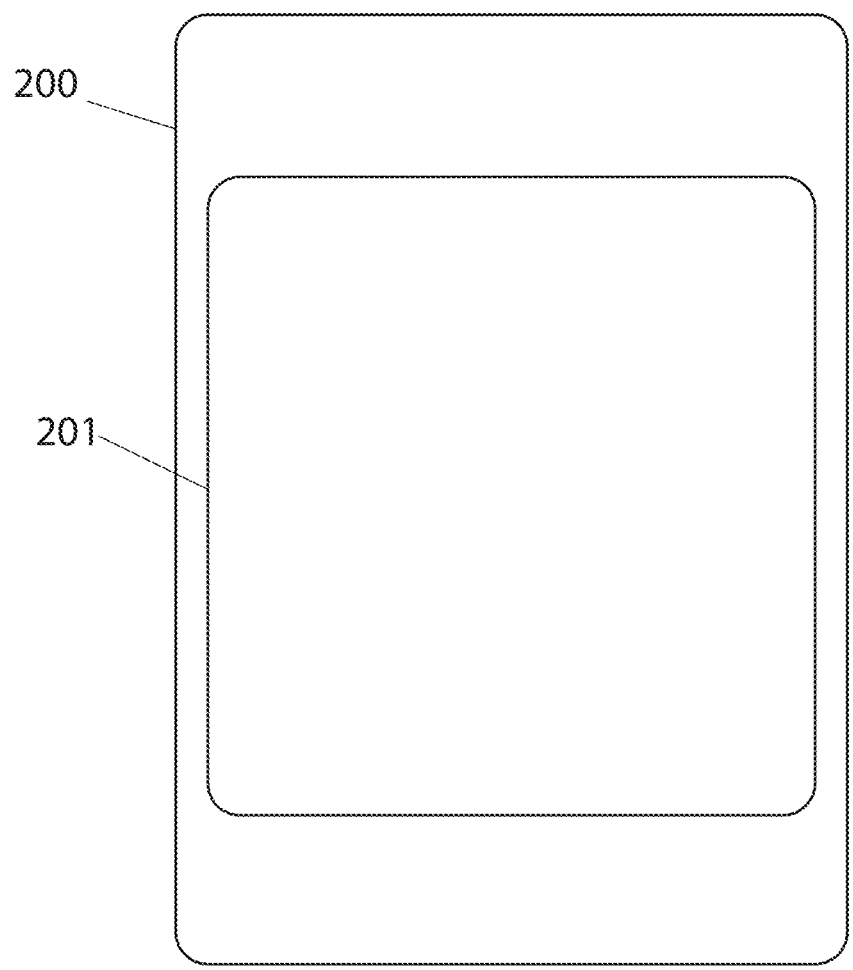
FIG. 2 illustrates an example of a communication device with user interface touchscreen that may be paired with the smart gym equipment, according to some embodiments

FIG. 2 illustrates an example of a communication device, mobile device 200 with user interface touchscreen 201. Mobile device 200 with touchscreen 201 may be used to execute an application paired with the smart gym equipment. A person may provide input to the application (e.g., magnitude of weight, particular exercise, age, weight, exercise goals, etc.) using the touchscreen and the application may transmit the input data to the processor of the smart gym equipment. The processor of the smart gym equipment may autonomously adjust equipment settings based on the input data received.

Figure 3:
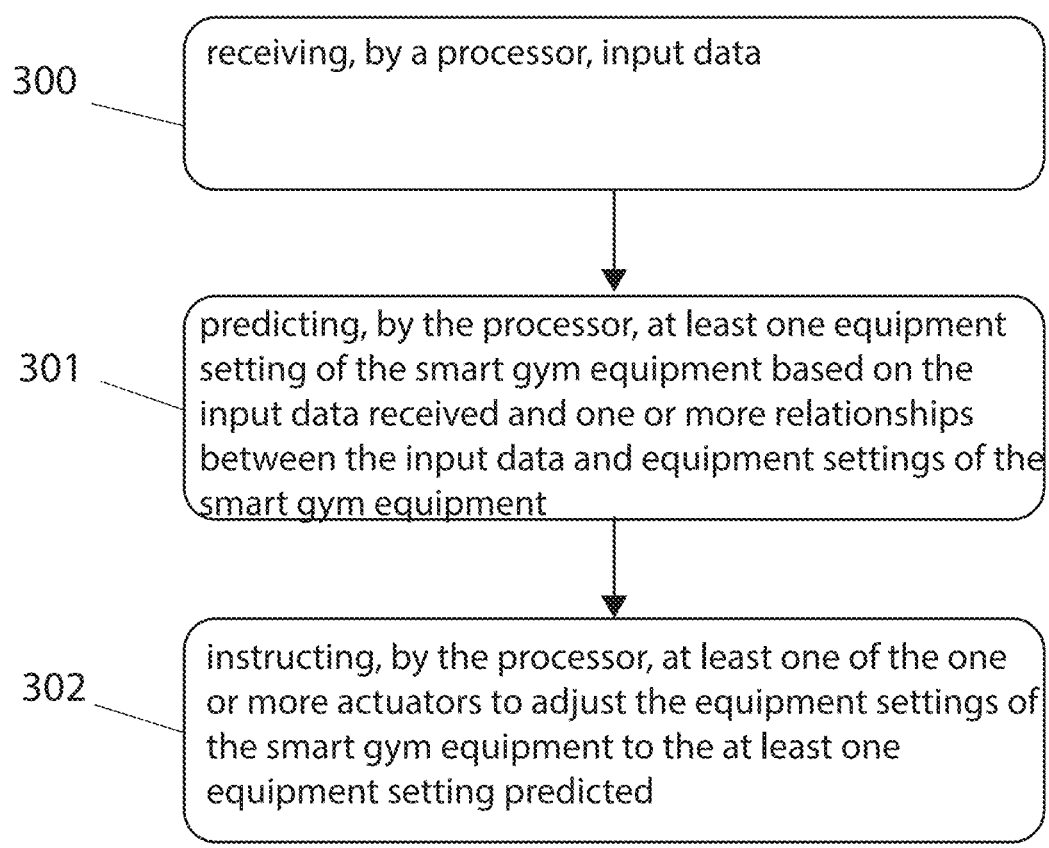
FIG. 3 illustrates a flowchart describing an example of a method for autonomously adjusting equipment settings of a smart gym equipment for a particular person, according to some embodiments.

FIG. 3 illustrates a flowchart describing an example of a method for autonomously adjusting equipment settings of a smart gym equipment for a particular person, including steps 300, 301, and 302.

Figure 4:
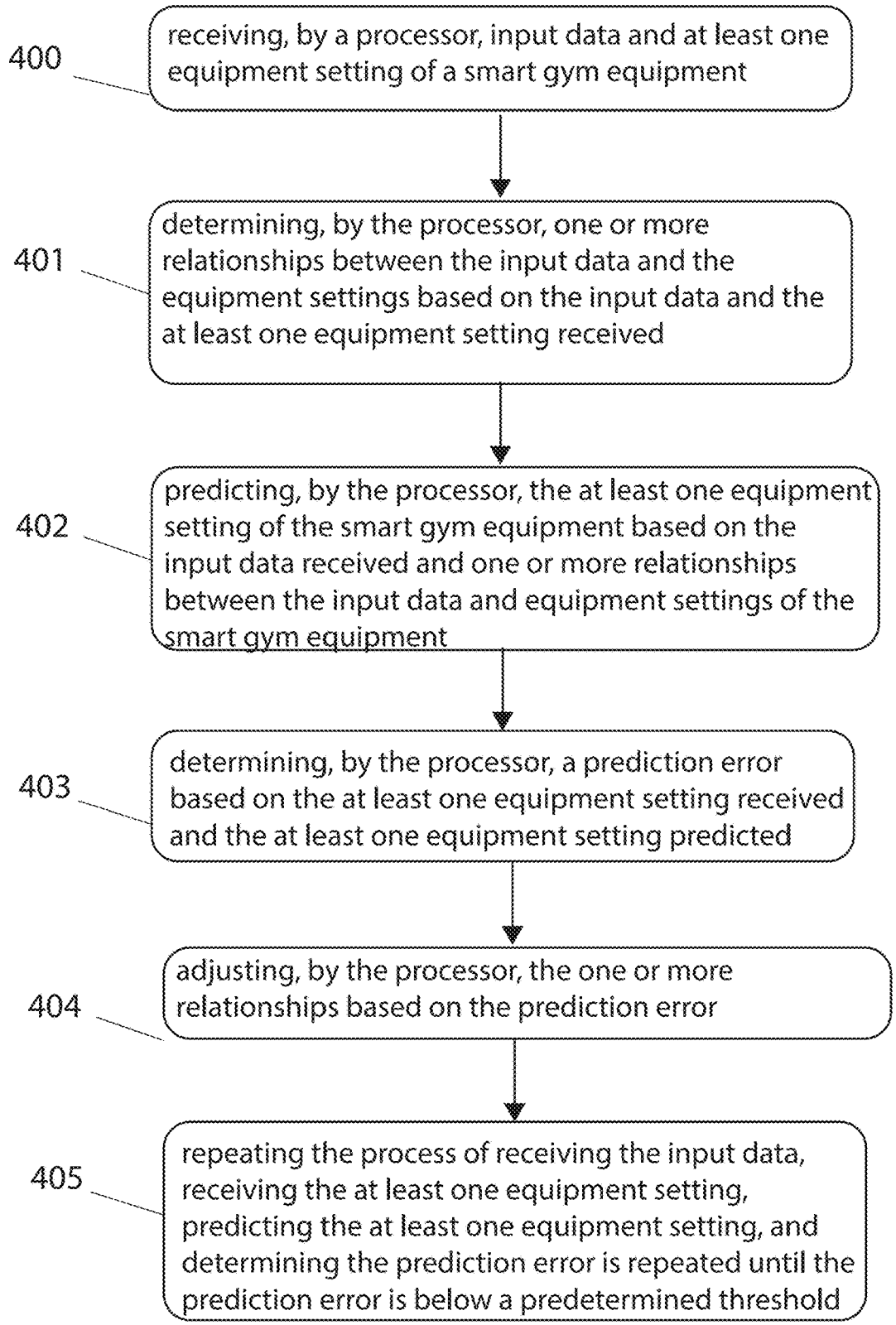
FIG. 4 illustrates a flowchart describing an example of a method for learning one or more relationships between input data and equipment settings of a smart gym equipment, according to some embodiments.

FIG. 4 illustrates a flowchart describing an example of a method for learning one or more relationships between input data and equipment settings of a smart gym equipment, including steps 400, 401, 402, 403, 404, and 405.

The foregoing descriptions of specific embodiments of the invention have been presented for purposes of illustration and description. They are not intended to be exhaustive or to limit the invention to the precise forms disclosed. Obviously, many modifications and variations are possible in light of the above teaching.

In block diagrams, illustrated components are depicted as discrete functional blocks, but embodiments are not limited to systems in which the functionality described herein is organized as illustrated. The functionality provided by each of the components may be provided by specialized software or specially designed hardware modules that are differently organized than is presently depicted; for example, such software or hardware may be intermingled, conjoined, replicated, broken up, distributed (e.g. within a data center or geographically), or otherwise differently organized. The functionality described herein may be provided by one or more processors of one or more computers executing specialized code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation.

The invention claimed is:

1. A smart gym equipment, comprising:
a frame;
a plurality of sensors;
at least one actuator;
a plurality of weights;
a processor; and,
a tangible, non-transitory, machine-readable medium storing instructions that when executed by the processor effectuates operations comprising:
obtaining, with the processor, sensor data captured by at least some of the plurality of sensors;
receiving, with the processor, input data;
predicting, with the processor, a value of at least one equipment setting of the smart gym equipment based on at least some of the input data and at least one relationship determined based on a plurality of previous input data and corresponding previous values of the at least one equipment setting; and
instructing, with the processor, the at least one actuator to automatically implement the value of the at least one equipment setting predicted.

2. The smart gym equipment of claim 1, wherein the at least one actuator adjusts at least two of a height, a position, and an angle of a component of the smart gym equipment.

3. The smart gym equipment of claim 2, wherein the component comprises a pulley.

4. The smart gym equipment of claim 1, wherein:
settings of the smart gym equipment comprise at least one of: a particular exercise, a magnitude of weight for a particular exercise, a duration for performing a particular exercise, a number of repetitions for a particular exercise, a change in a magnitude of weight during a particular exercise and at which repetition the change is to be implemented, an order of exercises performed during an exercise session, a height of a component of the smart gym equipment for a particular exercise, an angle of a component of the smart gym equipment for a particular exercise, a position of a component of the smart gym equipment for a particular exercise, a total duration of an exercise session, and a television channel or program to display on a screen of the smart gym equipment.

5. The smart gym equipment of claim 1, wherein the input data comprises at least one of:
at least some sensor data, at least some user data, and at least some user feedback.

6. The smart gym equipment of claim 5, wherein the user data comprises at least one of: a name of the user, an age of the user, a weight of the user, a height of the user, a preferred duration of exercise, preferred exercises, an exercise schedule, a target weight of the user, a target lifting weight for a particular exercise, a target number of repetitions for a particular exercise, a target duration for a particular exercise, previous exercises performed, weights lifted for previous exercises performed, duration of previous exercises performed, a number of repetitions for previous exercises performed, a level of completion of previous repetitions performed, a maximum weight lifted for previous exercises performed, a total duration of exercise sessions, a preferred height of a component of the smart gym equipment for a particular exercise, a preferred angle of a component of the smart gym equipment for a particular exercise, and a preferred position of a component of the smart gym equipment for a particular exercise.

7. The smart gym equipment of claim 6, wherein an application of a communication device is paired with the smart gym equipment and configured to receive at least one input designating user data.

8. The smart gym equipment of claim 1, wherein the plurality of sensors comprises at least one of: a force sensor, an optical encoder, an accelerometer, a weight sensor, an electrical current sensor, an imaging sensor, a depth sensor, a gyroscope, an odometer, an optical sensor, an extensometer, a speedometer, a timer, and a repetition counter.

9. The smart gym equipment of claim 1, wherein determining the at least one relationship comprises
receiving, with the processor, each of the plurality of previous input data;
receiving, with the processor, a value of the at least one equipment setting of the smart gym equipment corresponding with each of the plurality of previous input data;
determining, with the processor, the at least one relationship based on the plurality of previous input data and the corresponding values of the at least one equipment setting received;
predicting, with the processor, a value of the at least one equipment setting based on new input data received using the at least one relationship;
determining, with the processor, a prediction error based on a difference between the value of the at least one equipment setting received and the value of the at least one equipment setting predicted; and
adjusting, with the processor, the at least one relationship based on the prediction error;
wherein the process of receiving each of the plurality of input data, receiving the value of the at least one equipment setting, predicting the value of the at least one equipment setting, and determining the prediction error is repeated until the prediction error is below a predetermined threshold.

10. The smart gym equipment of claim 9, wherein:
the value of the at least one equipment setting received is received from an application of a communication device or a user interface of the smart gym equipment; and
the operations further comprise:
instructing, with the processor, the at least one actuator to implement the value of the at least one equipment setting received.

11. The smart gym equipment of claim 9, wherein:
the value of the at least one equipment setting received is received from at least one sensor of the plurality of sensors; and
the operations further comprise:
instructing, with the processor, the at least one actuator to implement the value of the at least one equipment setting received.

12. The smart gym equipment of claim 1, wherein the processor determines the at least one relationship using machine learning.

13. The smart gym equipment of claim 1, wherein the operations further comprise:
instructing, with the processor, the at least one actuator to implement a value of an equipment setting based on at least some of the sensor data.

14. The smart gym equipment of claim 1, wherein:
the at least one equipment setting comprises at least a magnitude of a weight for a particular exercise; and
the at least one actuator implements the value of the at least one equipment setting.

15. The smart gym equipment of claim 1, wherein the operations further comprise:
determining, with the processor, suggested exercises for an exercise session unique to a particular user based on an exercise history, sensor data history, a fitness level, a weight, and an age of the particular user, wherein the particular user is presented with the suggested exercises and accepts or declines the suggested exercises using an application of a communication device paired with the smart gym equipment or a user interface of the smart gym equipment.

16. The smart gym equipment of claim 1, wherein the operations further comprise:
instructing, with the processor, the at least one actuator to adjust the smart gym equipment for a next exercise after a number of repetitions for a current exercise has been reached.

17. The smart gym equipment of claim 1, wherein the operations further comprise:
receiving, with the processor, a rating for the value of the at least one equipment setting predicted; and
adjusting, with the processor, the at least one relationship based on the rating.

18. The smart gym equipment of claim 1, wherein the operations further comprise:
determining, with the processor, suggested equipment settings for a particular user based on at least one of an exercise history, sensor data history, a fitness level, a weight, and an age of the particular user; and
adjusting, with the processor, the at least one relationship based on a response from the particular user to the suggested equipment settings.

19. The smart gym equipment of claim 1, wherein:
an application of a communication device paired with the smart gym equipment or a user interface of the smart gym equipment is configured to:
receive at least one input designating a particular muscle group; and
display a selection of possible exercise routines for the particular muscle group selected.

20. The smart gym equipment of claim 1, wherein the plurality of weights comprises at least a plurality of stacked block-shaped free weights.

* * * * *